US009535756B2

(12) United States Patent
Depner et al.

(10) Patent No.: US 9,535,756 B2
(45) Date of Patent: Jan. 3, 2017

(54) LATENCY-HIDING CONTEXT MANAGEMENT FOR CONCURRENT DISTRIBUTED TASKS IN A DISTRIBUTED SYSTEM (71) Applicant: Oracle International Corporation, Redwood Shores, CA (US)

(72) Inventors: Siegfried Depner, Bavaria (DE); Jan Van Der Lugt, San Francisco, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/619,414

(22) Filed: Feb. 11, 2015

(65) Prior Publication Data
US 2016/0232037 A1    Aug. 11, 2016

(51) Int. Cl.
G06F 9/46        (2006.01)
G06F 3/00        (2006.01)
G06F 15/16       (2006.01)
G06F 9/50        (2006.01)

(52) U.S. Cl.
CPC .................. *G06F 9/5016* (2013.01)

(58) Field of Classification Search
None
See application file for complete search history.

(56) References Cited

U.S. PATENT DOCUMENTS

2003/0084045 A1*  5/2003  Anderson .............. H04L 67/06
2014/0047140 A1*  2/2014  Otenko ................. G06F 9/5027
                                                   710/54

OTHER PUBLICATIONS

Xin et al., "GraphX Resilient Distributed Graph System on Spark", dated Jun. 23, 2013, Proceedings of the First International Workshop on Graph Data Management, 6 Pages.
Nelson et al., "Latency-Tolerant Software Distributed Shared Memory", Technical Report UW-CSE-14-05-03, dated 2014, 13 pages.
Malewicz et al., "Pregel: A System for Large-Scale Graph Processing", SIGMOD, ACM, dated Jun. 2010, 11 pages.
Low et al., "GraphLab: A New Framework for Parallel Machine Learning", dated Jun. 25, 2010, 10 pages.

* cited by examiner

*Primary Examiner* — Bing Zhao
(74) *Attorney, Agent, or Firm* — Hickman Palermo Becker Bingham LLP; Marcel K. Bingham (57) ABSTRACT

Techniques are provided for latency-hiding context management for concurrent distributed tasks. A plurality of task objects is processed, including a first task object corresponding to a first task that includes access to first data residing on a remote machine. A first access request is added to a request buffer. A first task reference identifying the first task object is added to a companion buffer. A request message including the request buffer is sent to the remote machine. A response message is received, including first response data responsive to the first access request. For each response of one or more responses of the response message, the response is read from the response message, a next task reference is read from the companion buffer, and a next task corresponding to the next task reference is continued based on the response. The first task is identified and continued.

20 Claims, 6 Drawing Sheets

LATENCY-HIDING CONTEXT MANAGEMENT FOR CONCURRENT DISTRIBUTED TASKS IN A DISTRIBUTED SYSTEM

FIELD OF THE INVENTION

Embodiments of the invention described herein relate generally to distributed systems, and, more specifically, to context management for concurrent distributed tasks.

BACKGROUND

Distributed systems are frequently used to store and perform operations on large data sets. However, the scalability of this solution is limited because the performance of distributed data processing systems is often bottlenecked by communication latency. When a data set is distributed across multiple machines, communication latency is caused by the time delay to move data across different machines. For example, when a set of computations is performed on data that must be retrieved from a different machine, a thread or process of the local machine must wait for the data to be retrieved before finishing the set of computations. When the set of computations can be performed quickly, the wait time becomes a limiting factor. For example, if the local machine performs computations on an amount of remotely-stored data that is small, and the computation time scales relative to the size of the data, then the computation time will be small relative to the communication time since the communication time includes latency that does not decrease with the size of the data.

Context switching is one technique to address communication latency. Context switching is the process of storing the context, or state, of a process or thread so that execution can be resumed from the same point at a later time. In distributed data processing systems, when a plurality of concurrent tasks is processed, context switching is implemented as follows: when a thread handles a task that requires a remote data access, the task initiates a remote access request and the task is suspended. Meanwhile, the thread is free to perform other tasks, freeing up the computational resource. The execution of the suspended task is resumed when the remote data access is complete. This context switching technique is typically implemented with a ready task queue and a suspended task queue. One or more worker threads select tasks to execute from the ready task queue. Suspended tasks that require remote data access are placed into the suspended task queue. When a remote data access is complete, the task is moved back to the ready task queue so that worker threads can resume execution.

The context switching mechanism described above is effective at hiding communication latency when the number of remote data accesses and concurrent tasks is small. However, the ready task queue and the suspended task queue become a performance bottleneck under certain conditions, such as when the number of remote data accesses is large, the number of concurrent tasks is large, and/or the data size of each remote data access is small. These conditions tend to occur for distributed graph processing on large graph data sets.

Graph-based modeling of data is a powerful tool for analyzing and discovering relationships within a data set. When the dataset is larger than the main memory of a single machine, distributed graph processing is particularly useful. Many graph operations are easily parallelizable due to the characteristics of graph-based models. However, communication latency reduces the scalability of distributed graph processing because graph analysis workloads typically involve a massive number of concurrent tasks that require many remote data accesses, including many remote accesses of a small amount of data. Often, the amount of the available computation of the distributed system is not utilized because communication latency acts as a bottleneck.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for latency-hiding context management for concurrent distributed tasks. At a local computing unit of a distributed computing system, a worker thread handles a plurality of tasks. When a task initiates a remote access to data stored at a remote computing unit, an access request is stored in a request buffer for the remote computing unit. A companion buffer is also maintained for each request buffer. For each entry in the request buffer, a task reference is stored in the companion buffer. The task reference identifies the task corresponding to the access request. After the access request is entered, the worker thread continues with another task. At this point, the task that initiated the access request is blocked. As used herein, the term "blocked" refers to suspending processing of a task. For example, a task may be blocked to process a subtask, wait for a remote access, or wait for a remote procedure call. While the task is blocked, another task is selected for execution.

A request message is sent from the local computing unit to the remote computing unit. The request message includes the access requests in the request buffer. A response message is received from the remote computing unit. The response message includes responses to the access requests of the request message. After the response message is received, the worker thread resumes the corresponding tasks, using the companion buffer to identify the task that corresponds to each response in the response message.

In one embodiment, when the tasks handled by the worker thread require remote access to data stored at different remote computing units, distinct request buffers are maintained for the different remote computing units. In this case, each response message is only sent to one remote destination, and a single response message is received in response to each response message.

In one embodiment, response messages are provided to the originating thread such that the thread that generated a request message processes the corresponding response message. This ensures that a task is processed by a single thread, even if the task was blocked in the middle of execution.

In one embodiment, one or more access requests include one or more remote procedure calls. The remote procedure calls may also be stored in the request buffer and sent to the remote computing unit in the response message. In one embodiment, a return value of a remote procedure call is contained in a response to the corresponding response message.

In one embodiment, the request message includes a reference to the corresponding companion buffer, and the response message also includes the reference to the corresponding companion buffer. After the request message is sent, the request buffer is returned to a pool of request buffers on the local computing unit. After the response message is received and the blocked tasks are resumed and processed, the companion buffer is returned to a pool of companion buffers on the local computing unit.

The techniques described herein enable an efficient distributed graph processing system. The techniques may also be applied to any distributed processing system that handles workloads comprising a large number of concurrent tasks, a large number of remote accesses and/or remote accesses of a small size.

System Overview

Figure 1:
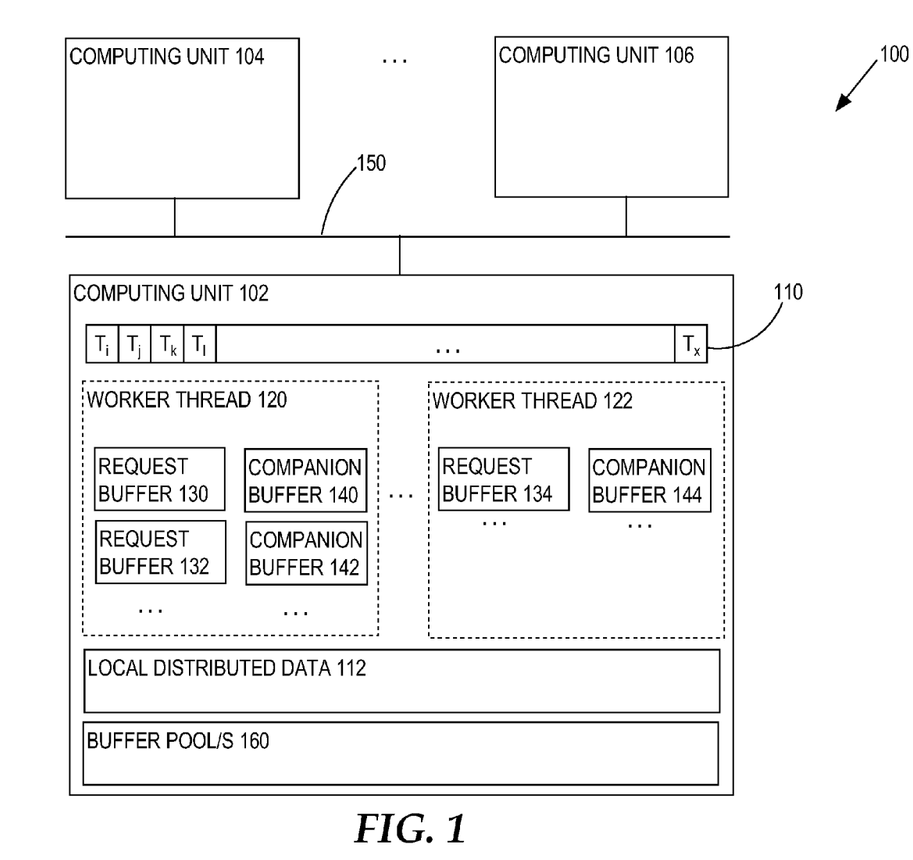
FIG. 1 illustrates an embodiment of a distributed computing system which may be used to implement one or more embodiments.

FIG. 1 illustrates an embodiment of a distributed computing system which may be used to implement one or more embodiments. Distributed computing system 100 comprises a plurality of computing units 102-106 configured to store and/or process a distributed data set. In one embodiment, distributed computing system 100 is a distributed graph processing system configured to store and process a distributed graph instance.

As used herein, the term "computing unit" refers to an individual computing unit that acts as a member of a distributed computing system. For example, a computing unit may refer to a computing node within a cluster of nodes, a grid computer within a grid computing system, a stand-alone computer in a network of computers, or any other computing unit capable of acting as a member of a distributed computing system. A computing unit includes one or more hardware processing elements, such as central processing units, microprocessors, processor cores, or other hardware processors. A computing unit further includes memory, such as a random access memory (RAM) and/or other volatile memory. In one embodiment, one or more computing units 102-106 are configured to store at least a portion of the distributed data set in volatile memory.

Computing units 102-106 are communicatively coupled by communication infrastructure 150. For example, communication infrastructure 150 may comprise one or more networks, links, communication buses, communication fabrics, or any other communication infrastructure over which communication can be established between computing units 102-106. In one embodiment, computing units 102-106 are interconnected using a switched fabric network infrastructure, such as InfiniBand™.

FIG. 1 shows a detailed view of a particular computing unit 102. In the following description of computing unit 102, computing unit 102 is referred to as the local computing unit, and computing units 104-106 are described as remote computing units with respect to computing unit 102. However, the elements described with respect to computing unit 102 are present on other computing units 104-106 of distributed computing system 100. Local computing unit 102 communicates with remote computing units 104-106 over communication infrastructure 150.

Computing unit 102 is configured to store local distributed data 112. Local distributed data 112 is the portion of the distributed data set of distributed computing system 100 that is stored by computing unit 102. Any technique for distributing a data set over the computing units of the distributed computing system may be used without departing from the spirit or the scope of the techniques described herein. In one embodiment, computing unit 102 is configured to store local distributed data 112 in volatile memory. When computing unit 102 performs an operation that requires access to local distributed data 112, computing unit 102 accesses local distributed data 112 and completes the operation without the need for communication over communication infrastructure 150. When computing unit 102 performs an operation that requires access to distributed data stored on one or more remote computing units 104-106, the operation cannot be completed without communication with the respective remote computing unit 104-106 over communication infrastructure 150.

Task list 110 is a list of task objects corresponding to tasks assigned to computing unit 102. As used herein, the term "task object" refers to a data object that describes a task such that a computing unit can perform the corresponding task. For example, the task object may identify at least one operation and at least one input to the operation/s. In one embodiment, a task scheduler of distributed computing system 100 determines a plurality of tasks corresponding to a job to be performed on the distributed data set and assigns the plurality of tasks to the computing units 102-106 of distributed computing system 100. The determination and assignment of tasks can be optimized, such as to take advantage of how the distributed data set is distributed among the computing units 102-106. Any technique for determining concurrent tasks corresponding to a job and/or assigning the tasks to computing units within a distributed computing system may be used without departing from the spirit or the scope of the techniques described herein.

Worker Thread Operation

Worker threads 120-122 of computing unit 102 are configured to process task objects from task list 110, thereby performing the tasks assigned to computing unit 102. For example, a worker thread 120-122 may process a task object from task list 110 by performing at least one operation described in the task object. In one embodiment, task list 110 is an unstarted task list comprising task objects that correspond to tasks that have not yet been started by computing unit 102. In this case, when computing unit 102 starts a particular task, the corresponding task object is removed from unstarted task list 110. For example, when a particular worker thread is available, the particular worker thread may remove a task object from unstarted task list 110 and start performing the corresponding task. The particular thread may also remove a block of multiple task objects at once and perform the corresponding tasks sequentially.

When a task only requires access to local distributed data 112, a worker thread 120 may perform the task without any communication over communication infrastructure 150. When a task requires access to remote data, the task cannot be completed until the remote data is accessed. For tasks that require access to remote data, worker threads 120-122 store a corresponding access request in a request buffer 130-134. In one embodiment, each request buffer 130-134 corresponds to a particular remote computing unit. For example, worker thread 120 may store access requests to access data local to computing unit 104 in a first request buffer 130, and may store access requests to access data local to computing unit 106 in a second request buffer 132. A request buffer shall be described in greater detail hereafter.

Worker threads 120-122 also maintain a companion buffer 140-144 for each request buffer 130-134. For each entry in the corresponding request buffer 140-144, worker threads 120-122 store a task reference in the companion buffer. The task reference identifies the task corresponding to the remote data request. The companion buffer shall be described in greater detail hereafter.

After a worker thread stores a particular access request in a particular request buffer and a particular task reference in a particular companion buffer, the worker thread stops processing the particular task. The particular task is now blocked. The worker thread then proceeds to another task until a response to the access request is obtained. When the particular request buffer is full or a flush command is received, a request message is sent to the remote computing unit corresponding to the particular request buffer. A response message is received from the remote computing unit, and includes a response to the particular access request. The request message, the response message, and the usage thereof to continue the blocked tasks shall described in greater detail hereafter.

Request Buffer and Companion Buffer

Figure 2A:
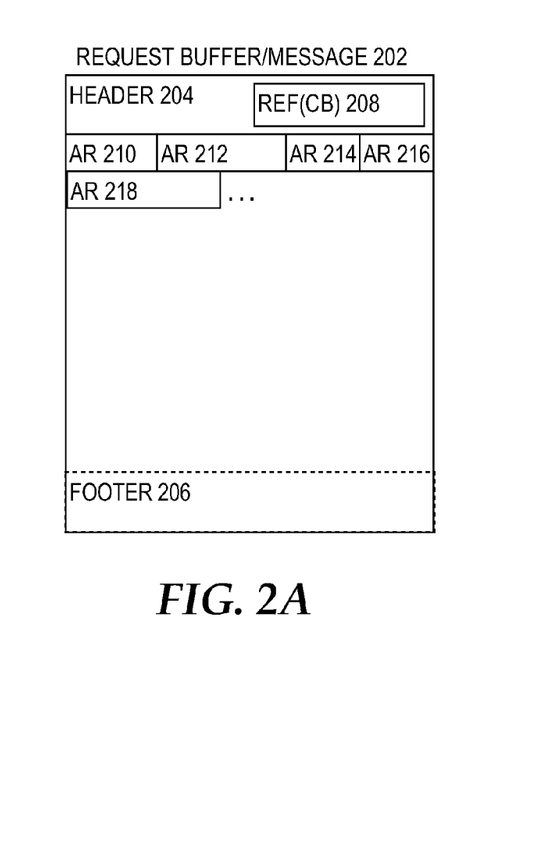
FIG. 2A illustrates an embodiment of a request buffer and/or a request message.

FIG. 2A illustrates an embodiment of a request buffer and/or a request message. A computing unit of a distributed computing system maintains request buffer 202, such as computing unit 102 of distributed computing system 100. In one embodiment, when a worker thread needs a new request buffer 202, the request buffer 202 is obtained from buffer pool 160. Buffer pool 160 comprises a plurality of pre-allocated request buffers 202. Request buffer 202 is returned to the buffer pool 160 after the request buffer is released. Buffer pool 160 shall be described in greater detail hereafter.

In one embodiment, each worker thread 120-122 of computing unit 102 maintains a distinct request buffer 202 for each remote computing unit 104-106 from which a data access is requested by a task handled by worker thread 120-122. In other words, a request buffer 202 is maintained per worker thread 120-122 and per destination 104-106. Thus, a request message generated based on a particular request buffer 202 is sent to a single remote computing unit. As used herein, the term "destination" refers to a remote computing unit 104-106 that is a target of one or more access requests.

When a worker thread processes a task object for a task that requires access to remote data at a particular remote destination, the worker thread stores a corresponding access request 210-218 in request buffer 202. For example, the worker thread may store a particular access request 210 in a particular request buffer 202 that maintained for the worker thread and the particular remote destination. After the particular access request 210 is stored, the worker thread stops processing the particular task that generated the particular access request 210. The worker thread is free to process a subsequent task object. The corresponding task is now blocked.

If the worker thread does not currently maintain a request buffer 202 for the particular remote destination, the worker thread may associate a request buffer 202 for the particular remote destination. For example, the worker thread may allocate a new request buffer 202 for the particular remote destination, or may obtain a pre-allocated request buffer 202, such as a request buffer 202 from buffer pool 160.

Figures 2B, 2C:
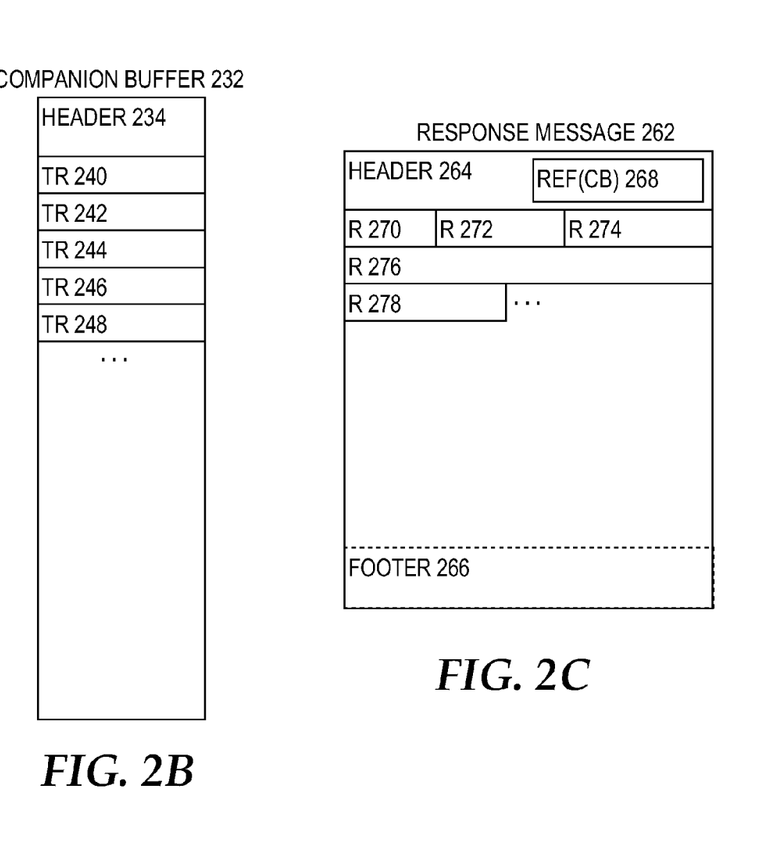
FIG. 2B illustrates an embodiment of a companion buffer.
FIG. 2C illustrates an embodiment of a response message.

The worker thread also maintains a companion buffer 232 for each request buffer 202. FIG. 2B illustrates an embodiment of a companion buffer. For each access request 210-218, the worker thread also stores a task reference 240-248 in companion buffer 232. The particular access request 210 may be stored in any format that corresponds to data stored in the companion buffer 232. In one embodiment, the worker thread stores the access requests 210-218 in the same order as the task references 240-248 stored in companion buffer 232. For example, access request 210 corresponds to task reference 240, access request 212 corresponds to task reference 242, access request 214 corresponds to task reference 244, access request 216 corresponds to task reference 246, and access request 218 corresponds to task reference 248. Specifically, the corresponding task reference 240-248 identifies a task from which the respective access request 210-218 was generated. In one embodiment, task references 240-248 each identify a task object corresponding to the respective task.

In one embodiment, access requests 210-218 are stored in request buffer 202 in the order that they are generated. In one embodiment, the request buffer 202 comprises a list of access requests 210-218. Each access request 210-218 may include header information and/or footer information that indicates the start and/or end of a particular access request.

An access request 210-218 generated at a local computing unit 102 describes a request to access a remote computing unit 104-106. For example, an access request may describe a read request to obtain data from a remote computing unit, and may include an address of the requested data and/or a size of the requested data. In one embodiment, the size of the requested data is indicated by a data type for the requested data.

In one embodiment, the request to access the remote computing unit comprises a remote procedure call to remotely invoke a procedure at the remote computing unit. For example, the access request may identify a particular procedure and any input arguments for the remote procedure. In one embodiment, the input arguments comprise remote data stored at the remote computing unit. The access request includes information identifying the remote data to be processed by the procedure. In one embodiment, the access request includes information identifying the access request as a remote procedure call.

Request Message

A request message is sent from a local computing unit to a destination computing unit. The request message includes the access requests 210-218 of the request buffer 202. The request message is sent when the request buffer 202 is full. In one embodiment, a request message may be sent upon a flush command or any other command to immediately send a request message based on the current request buffer.

Request message 202 is generated based on a corresponding request buffer 202. A request buffer 202 and its corresponding request message 202 may be logically represented by the same components. Thus, FIG. 2A is used to illustrate both a request message 202 and a request buffer 202. In an implementation, the request message 202 may be generated by copying or reusing components of the corresponding request buffer 202. In one embodiment, the request message 202 is the request buffer 202, or is generated by modifying and/or appending data to request buffer 202. In one embodiment, the same data structure is used for the request message 202 and the request buffer 202.

Request message 202 may include a message header 204 and/or a message footer 206 that allows request message 202 to be routed to the corresponding destination computing unit. For example, header 204 and/or footer 206 may include a source computing unit id, a destination computing unit id, a message size, or other components that may be used to route request message 202.

In one embodiment, header 204 and/or footer 206 includes a companion buffer reference 232. Companion buffer reference 232 identifies a companion buffer at the local computing unit that corresponds to request buffer/message 202. The companion buffer reference 232 is later used to resume tasks when processing a response message 262, which shall be described in greater detail hereafter.

The request message is sent to the destination computing unit. In one embodiment, after the request message is sent, the request buffer 202 is no longer needed by the worker thread. For example, the request buffer 202 may be returned to a buffer pool 160 after the request message is sent. After the request message is sent to the destination computing unit, any subsequent access requests to the same destination computing unit are stored in a new request buffer associated with the destination computing unit. A new companion buffer is also maintained in association with the new request buffer.

Response Message

FIG. 2C illustrates an embodiment of a response message. Response message 262 is generated in response to a request message 202, and contains responses 270-278 that are responsive to access requests 210-218 of request message 202. In one embodiment, response message 262 is generated by a destination computing unit to which access requests 210-218 are directed. Response message 262 is sent from the destination computing unit to the computing unit that generated the corresponding request message 202. Responses 270-278 are each responsive a corresponding access request 210-218 sent in the corresponding request message 202. For example, a response 270-278 may include data requested from a remote computing unit or a return value of a remote procedure call invoked on the remote computing unit.

In one embodiment, response message 262 comprises a list of responses 270-278. Responses 270-278 may be listed in the same order as the corresponding access requests 210-218. Each response 270-278 may include header information and/or footer information may indicate the start and/or end of a response.

A thread that processes responses 270-278 in response message 262 resumes the corresponding tasks (i.e. the tasks that initiated access requests 210-218) by using task references 240-248 stored in the corresponding companion buffer 232. In one embodiment, a worker thread continues the tasks corresponding to the responses 270-278 in response message 262. In one embodiment, the worker thread resumes the corresponding tasks by invoking a continuation method for a task object corresponding to each task.

In one embodiment, a response message 262 received from a particular remote computing unit is processed by the same worker thread that generated the corresponding request buffer 202 and companion buffer 232. This ensures that tasks are processed by a single worker thread, even if a task was blocked in the middle of execution due to a remote access. Because such tasks are executed by the same worker thread before and after blocking, there is no need to protect private fields of the corresponding task object. For example, locking mechanisms do not need to be implemented on such portions of the task object. Furthermore, it becomes straightforward to track pending tasks within the distributed computing system.

In one embodiment, responses 270-278 of response message 262 are in the same order as access requests 210-218 of the corresponding request message 202 and task references 240-248 of the corresponding companion buffer. The thread processes response message 262 by iterating over response message 262 and companion buffer 232. In one embodiment, response message 262 is processed after request buffer 202 is already released because companion buffer 232 and response message 262 contain sufficient data to continue the corresponding tasks without needing request buffer 202 to be kept in memory. In this manner, blocked tasks that are related to request message 202 and response message 262 are easily retrieved and resumed. No synchronization overhead is required because no shared blocked task queue is maintained.

Response message 262 may include a message header 264 and/or a message footer 266 that allows response message 262 to be routed to the computing unit that generated the corresponding request message 202. For example, header 264 and/or footer 266 may include a source computing unit id, a destination computing unit id, a message size, or other components that may be used to route response message 262. In one embodiment, header 264 and/or footer 266 includes a companion buffer reference 268 that identifies the corresponding companion buffer that was associated with the original request message 202. The corresponding companion buffer is identified based on the companion buffer reference 268 when processing response message 262. In one embodiment, companion buffer reference 268 of response message 262 is a copy of a companion buffer reference 208 of request message 202.

In one embodiment, when a worker thread receives response message 262, processing response message 262 is prioritized over processing new task objects 110. In one embodiment, the worker thread receives response message 262 from a communication layer of the computing unit that manages remote communications with remote computing units in the distributed computing system.

Buffer Pools

In one embodiment, computing units 102-106 further comprise one or more buffer pools 160. Buffer pool/s 160 comprise pre-allocated and recyclable buffers. The size of buffer pool/s 160 may be dynamically adjusted. For example, the size of buffer pool/s 160 may be based on a number of remaining buffers of a particular type, an amount of available memory on local computing unit 102, or any other relevant factor. A buffer pool may include buffers of different types. Alternatively and/or in addition, different buffer pools may be maintained for different buffer types. For simplicity, a single buffer pool is referred to hereafter.

In one embodiment, buffer pool 160 includes pre-allocated request buffers. A worker thread 120-122 may obtain a pre-allocated request buffer from buffer pool 160 and return the request buffer to the buffer pool 160 when the request buffer is no longer needed. In one embodiment, buffer pool 160 includes pre-allocated companion buffers. A worker thread 120-122 may obtain a pre-allocated companion buffer from buffer pool 160 and return the companion buffer to buffer pool 160 when the companion buffer is no longer needed.

In one embodiment, a request buffer is obtained from buffer pool 160 when a worker thread processes a task that requires a remote access to data stored at a remote destination, but no current request buffer is maintained for the particular destination and worker thread combination. The request buffer is returned to buffer pool 160 after a corresponding request message is sent to the particular destination.

In one embodiment, buffer pool 160 includes pre-allocated request buffers of different sizes. For example, buffer pool 160 may include large request buffers and small request buffers.

Remote Procedure Calls

In one embodiment, one or more access requests 210-218 are remote procedure calls. Remote method invocation reduces overall traffic by moving computation to the destination computing unit. Instead of transferring data to the local computing unit and performing the computation at the local computing unit, a method is invoked at the destination computing unit on the remote data. In one embodiment, a set of remote methods are registered on every computing unit of the distributed system. In one embodiment, a remote method may return a partial result based on the data stored at the destination computing unit.

Remote procedure calls are stored as access requests 210-218 in a request buffer 202 and sent to the remote computing unit in the response message 202. For example, an access request corresponding to a remote procedure call may include data identifying a particular procedure and any input arguments for the particular procedure. The input arguments may include one or more addresses for remote data stored at the destination computing unit. The return value of the remote method is returned to the local computing unit in a response 270-278.

Special-Purpose Request Messages

In one embodiment, special-purpose request messages are maintained. Each special-purpose request message contains only a specific data access type. In one embodiment, a special-purpose request message is designated for remote method invocation. Each special-purpose request message corresponds to a particular worker thread on a local computing unit, a particular destination computing unit, and a particular data access type. For example, for a particular worker thread and destination pair, one or more request buffers may be maintained including: a request buffer for general access requests to a particular destination; and/or one or more special-purpose request buffers for one or more particular data access types. It is possible for the worker thread to maintain only a special-purpose request buffer for a particular destination, such as when the worker thread has only processed task objects that only require a specific type of remote access of the particular destination.

In one embodiment, a special-purpose request message contains one or more pieces of common data in a header or footer of the special-purpose request message. For example, a special-purpose request message header may identify a particular remote method, and the access requests may each be a set of arguments for the particular remote method. Thus, the common data does not need to be stored in each access request in the body of the special-purpose request message. This potentially reduces both the message size of the special-purpose request message and the processing time at the destination computing unit. For example, any branching operation required at the destination computing unit to process the request message may be executed once per request message rather than for each individual access request within the request message.

Example Architecture

Figure 3:
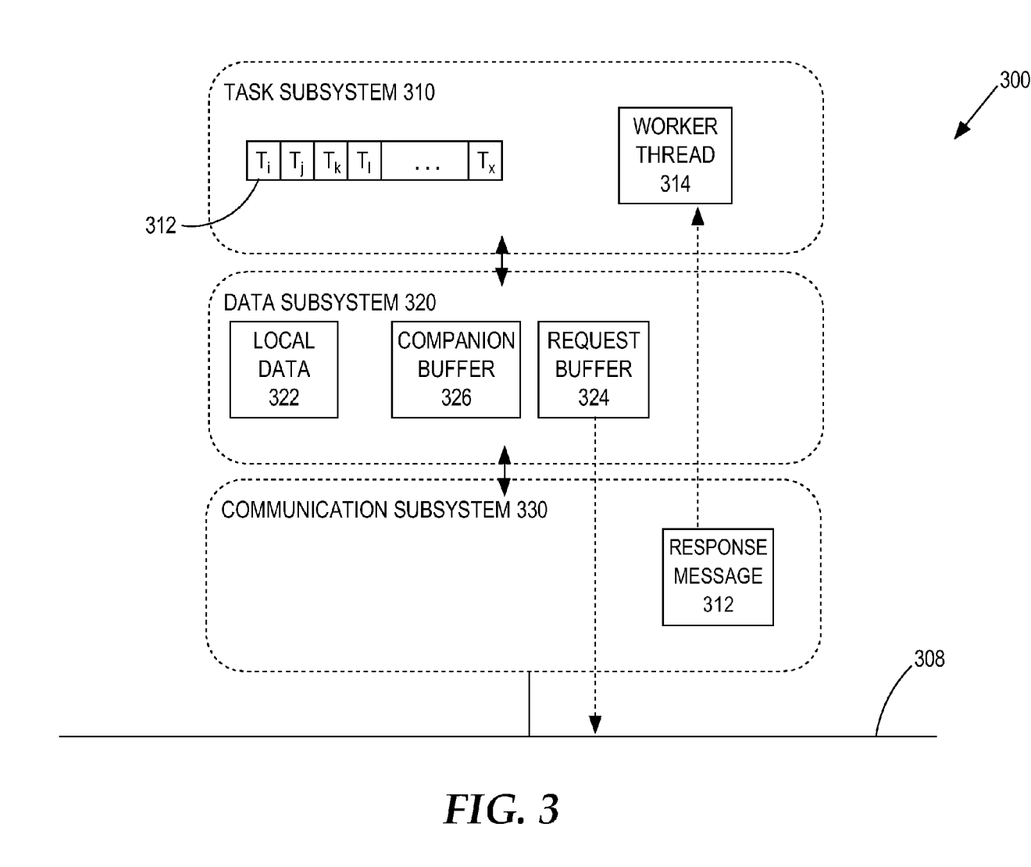
FIG. 3 illustrates a multitier architecture of one or more embodiments.

An example architecture is described for a distributed data processing system that implements latency-reducing context management for concurrent distributed tasks. FIG. 3 illustrates a multitier architecture of one or more embodiments. System 300 is on a computing unit of a distributed computing system, such as computing units 102-106. System 300 includes task subsystem 310, data subsystem 320 and communication subsystem 330. Although three subsystems are described, any system design may be used to implement the functionality thereof.

One or more distributed tasks are processed in task subsystem 310. For example, a block of one or more task objects 312 may be processed in series by one or more worker threads 314 of task subsystem 310. When worker thread 314 processes a task object that requires access to data, the access is handled by data subsystem 320. Task subsystem 310 may handle the actual location of data in a data request transparently with respect to the actual location of the data (i.e. whether the data to be accessed is stored locally or remotely on another computing unit of the distributed computing system).

In one embodiment, worker thread 314 communicates with data subsystem 320 to access data. If the data is present in local data 322 stored locally to the computing unit, data subsystem 320 provides the data to task subsystem 310. If the data is located remotely, data subsystem 320 enters the access request into request buffer 324 and enters the task reference for the task object that caused initiation the access request into companion buffer 326. In one embodiment, data subsystem 320 maintains the request buffers and/or companion buffers for the worker threads 314 of task subsystem 310.

Communication subsystem 330 handles communications between the computing unit and other computing units of the distributed computing system. In one embodiment, communication subsystem 330 sends a request message corresponding to a request buffer 324 when request buffer 324 is full, when a flush command is received, or when any other command is received that indicates that a request message should be sent for a particular buffer (i.e. a particular buffer associated with a particular worker thread and a particular destination computing unit, and optionally a particular type of remote access handled by a special-purpose access buffer). In one embodiment, communication subsystem 330 includes a polling thread that polls the networking hardware of the computing unit for incoming messages. Neither task subsystem 310 nor data subsystem 320 needs to interface with the networking hardware.

Example Processes for Generating a Request Message

Figure 4:
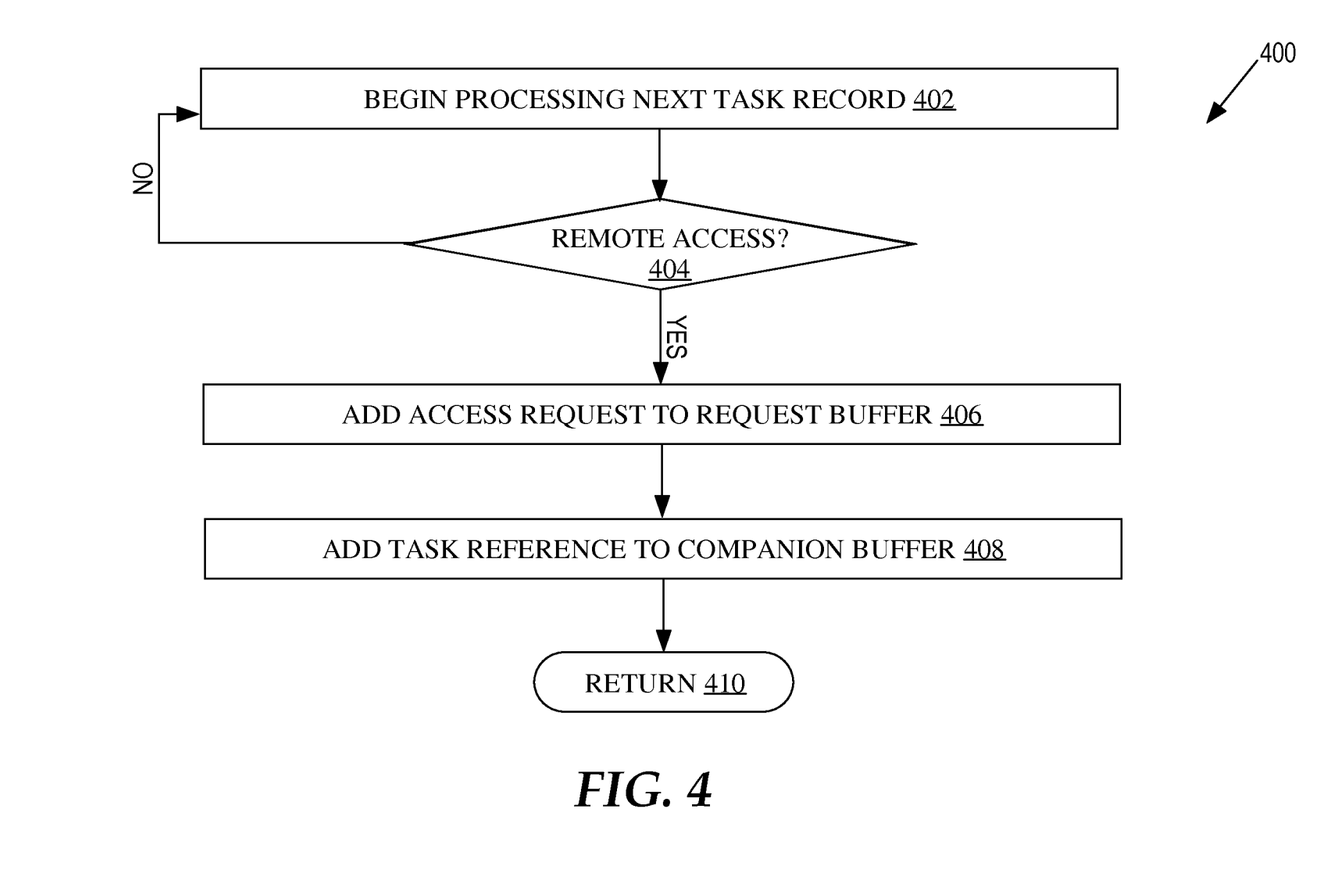
FIG. 4 is a flow diagram that illustrates an embodiment of a process for generating a request message.
Figure 6:
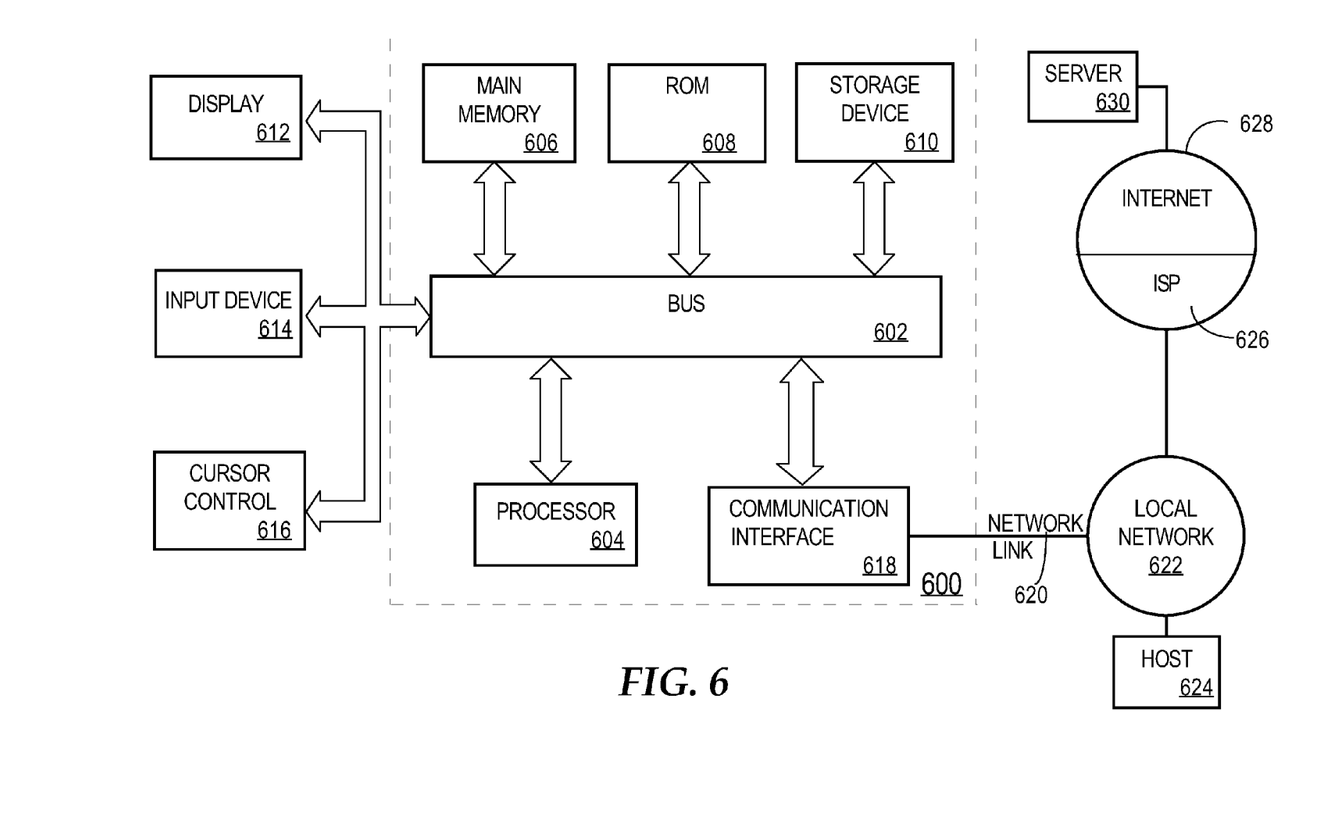
FIG. 6 illustrates a computer system upon which one or more embodiments may be implemented.

FIG. 4 is a flow diagram that illustrates an embodiment of a process for generating a request message. Process 400 may be performed by one or more computing devices and/or processes thereof. For example, one or more blocks of process 400 may be performed by computer system 600. In one embodiment, one or more blocks of process 400 are performed by one or more computing units of a distributed computing system, such as computing unit 102-106 of distributed computing system 100. In one embodiment, process 400 is performed by each of one or more worker threads of the computing unit, such as worker threads 120-122.

At block 402, the next task object is processed. In one embodiment, the next task object is processed by a worker thread, which may be one of a plurality of worker threads executing at a computing unit, each of which is configured to process task objects. In one embodiment, the worker thread obtains one or more task objects from a list of unstarted task objects assigned to the computing unit. The worker thread may obtain a block of one or more unstarted task objects at once and process individual task objects in series.

At decision block 404, it is determined whether the task corresponding to the task object requires access to data stored at a remote destination. In one embodiment, the remote destination is another computing unit in the distributed computing system. If the task does not require remote access, the worker thread finishes processing the task object and returns to block 402, where a next task object is started. If the task requires a remote access, processing continues to block 406.

At block 406, an access request is added to a request buffer. The access request corresponds to the required access to the data stored at the remote destination. In one embodiment, the access request is added to a request buffer maintained by the worker thread for the remote destination.

At block 408, a task reference is added to a companion buffer. The task reference identifies the task corresponding to the access request. In one embodiment, a companion buffer is maintained for each request buffer. At this point, the task corresponding to the access request is considered blocked, and the worker thread is free to perform other computations.

At block 410, process 400 returns and/or terminates. For example, processing may return to block 402 to begin processing a next unstarted task object, passing control to a calling process, generating any appropriate record or notification, returning after a method or function invocation, or terminating. In one embodiment, before returning to block 402, it is determined whether any response message is waiting to be processed by the worker thread. If a response message is waiting to be processed by the worker thread, the worker thread may prioritize processing the response message.

In one embodiment, the worker thread performs both local and remote data accesses by interacting with a data layer at the local computing unit, where the data layer manages request buffer and the companion buffer operations. In one embodiment, when the request buffer is full or a command is received to flush the request buffer, a corresponding request message is sent to the remote computing unit by a communication layer of the computing unit, where the communication layer manages remote communications with remote computing units in the distributed computing system.

Example Processes for Handling a Response Message

Figure 5:
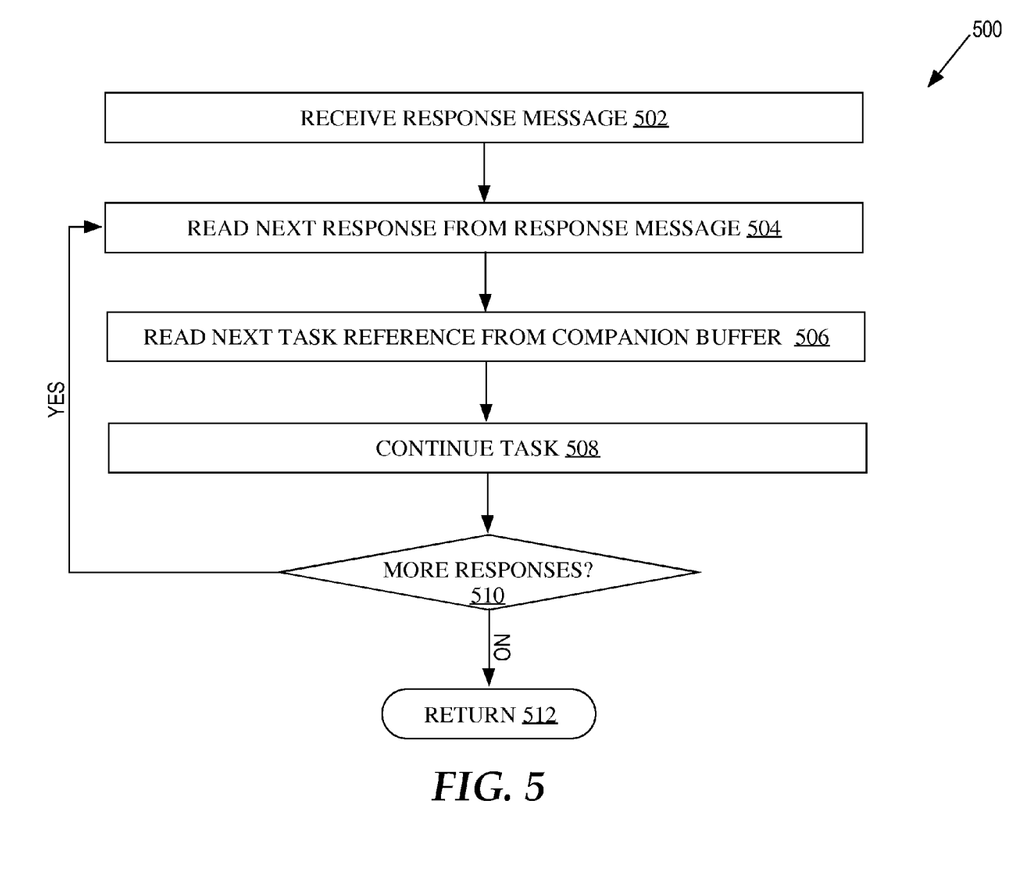
FIG. 5 is a flow diagram that illustrates an embodiment of a process for processing a response message.

FIG. 5 is a flow diagram that illustrates an embodiment of a process for processing a response message. Process 500 may be performed by one or more computing devices and/or processes thereof. For example, one or more blocks of process 500 may be performed by computer system 600. In one embodiment, one or more blocks of process 500 are performed by a computing unit of a distributed computing system, such as computing unit 102 of distributed computing system 100.

At block 502, a response message is received. The response message comprises a set of one or more responses to one or more access requests sent in a request message. The response message is sent to the computing unit by a remote computing unit in response to a request message sent from the computing unit of the worker thread. In one embodiment, the response message is provided to the worker thread that generated the corresponding request message. For example, the worker thread may receive the response message from a communication layer of the computing unit that manages remote communications with remote computing units in the distributed computing system.

At block 504, the worker thread reads a response from the response message. The response is responsive to an access request sent in the corresponding request message. For example, the response may include data from a remote computing unit or a return value of a remote procedure call sent to the remote computing unit. In one embodiment, the responses of the response message are in the same order as the access requests of the corresponding request message.

At block 506, the worker thread reads a task reference from the companion buffer. The task reference in the companion buffer corresponds to the response read from the response message. In one embodiment, the worker processes the response message by iterating through the response message and the companion buffer. In one embodiment, the companion buffer is identified using a companion buffer reference contained in the response message. The companion buffer reference contained in the response message may be copied into the response message from the corresponding request message.

At block 508, a task corresponding to the task reference is continued based on the response read from the response message. For example, the worker thread may identify the task object corresponding to the task reference from the companion buffer and continue processing the corresponding task based on the response from the response message. In one embodiment, the worker thread continues the corresponding task until the corresponding task terminates or until the task is blocked again. For example, the task may be blocked to wait for a remote access or wait for a remote procedure call. In one embodiment, the worker thread invokes a continuation method for a task object corresponding to each task.

At decision block 510, the worker thread determines whether the response message contains more responses to process. If the response message contains more responses to process, processing continues to block 504. Otherwise, processing continues to block 512.

At block 512, process 500 returns and/or terminates. For example, processing may return to processing a next unstarted task object, processing any awaiting response messages, passing control to a calling process, generating any appropriate record or notification, returning after a method or function invocation, or terminating.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
processing a first plurality of tasks by a first worker thread executing at a local computing unit of a plurality of computing units in a distributed computing system, wherein processing comprises, for each task of the first plurality of tasks that requires access to respective data stored at a particular remote computing unit of the plurality of computing units:
adding, to a request buffer, an access request for the respective data to which access is required by said each task;
adding, to a companion buffer, a task reference identifying said each task; and
blocking said each task and proceeding, by the first worker thread, to a next task of the first plurality of tasks;
in response to a decision to flush the request buffer, sending a request message comprising access requests in the request buffer to the particular remote computing unit;
receiving, from the particular remote computing unit, a response message comprising a plurality of responses to the access requests in the request message;
identifying a particular companion buffer containing tasks references identifying tasks processed by the first worker thread that require access to data stored at the particular remote computing unit; and
processing, by the first worker thread, the response message by, for each response of the plurality of responses:
identifying a corresponding task reference in the particular companion buffer that corresponds to said each response based on order or order information with respect to the particular companion buffer and the response message; and
using the corresponding task reference to identify and resume a task referenced by the corresponding task reference using the response;
wherein the method is performed by one or more computing devices.

2. The method of claim 1, further comprising:
processing a second plurality of tasks by a second worker thread executing at the local computing unit;
for each task of the second plurality of tasks that requires access to respective data stored at the particular remote computing unit:
adding, to a second request buffer, an access request for the respective data to which access is required by said each task,
adding, to a second companion buffer, a task reference identifying said each task, and
blocking said each task and proceeding, by the second worker thread, to a next task of the second plurality of tasks;
sending a second request message comprising access requests in the second request buffer to the particular remote computing unit;
receiving, from the particular remote computing unit, a second response message comprising a plurality of responses to the access requests in the second response message;
processing, by the second worker thread, the second response message.

3. The method of claim 1, further comprising:
for each task of the first plurality of tasks that requires access to respective data stored at a second remote computing unit:
adding, to a third request buffer, an access request for the respective data to which access is required by said each task,
adding, to a third companion buffer, a task reference identifying said each task, and
blocking said each task and proceeding, by the first worker thread, to a next task of the first plurality of tasks;
sending a third request message comprising access requests in the third request buffer to the second remote computing unit;
receiving, from the second remote computing unit, a third response message comprising a plurality of responses to access requests in the third response message;
processing, by the first worker thread, the third response message.

4. The method of claim 1, wherein, after sending the request message, access requests stored in the request buffer are released in memory.

5. The method of claim 4,
wherein the request buffer is a pre-allocated buffer obtained from a buffer pool;
wherein releasing the access requests stored in the request buffer includes returning the request buffer to the buffer pool after sending the request message to the particular remote computing unit.

6. The method of claim 1, further comprising:
maintaining a plurality of request buffers and a plurality of companion buffers at the local computing unit;
wherein each request buffer of the plurality of request buffers comprises access requests for data stored at a particular remote computing unit that is required for tasks processed by a specific worker thread.

7. The method of claim 1,
wherein the first plurality of tasks processed by the first worker thread that require access to respective data stored at the particular remote computing unit includes a task that requires access to data located in a volatile memory of the particular remote computing unit.

8. The method of claim 1,
wherein the first plurality of tasks processed by the first worker thread that require access to respective data stored at the particular remote computing unit includes a task that invokes a remote procedure call at the particular remote computing unit;
the method further comprising:
adding, to the request buffer, information comprising a remote procedure call;
wherein, when processing the request message to generate the response message, the particular remote computing unit processes the information by performing the remote procedure call.

9. The method of claim 1,
wherein at least one of the request message and the response message comprises metadata that includes a companion buffer reference identifying the particular companion buffer; and wherein identifying the particular companion buffer is based on the companion buffer reference.

10. The method of claim 1, wherein the decision to flush the request buffer is in response to determining that the request buffer is full or in response to a flush command.

11. At least one non-transitory computer-readable media storing instructions which, when executed by one or more processors, causes:
   processing a first plurality of tasks by a first worker thread executing at a local computing unit of a plurality of computing units in a distributed computing system, wherein processing comprises, for each task of the first plurality of tasks that requires access to respective data stored at a particular remote computing unit of the plurality of computing units:
      adding, to a request buffer, an access request for the respective data to which access is required by said each task;
      adding, to a companion buffer, a task reference identifying said each task; and
      blocking said each task and proceeding, by the first worker thread, to a next task of the first plurality of tasks;
   in response to a decision to flush the request buffer, sending a request message comprising access requests in the request buffer to the particular remote computing unit;
   receiving, from the particular remote computing unit, a response message comprising a plurality of responses to the access requests in the request message;
   identifying a particular companion buffer containing tasks references identifying the tasks processed by the first worker thread that require access to data stored at the particular remote computing unit; and
   processing, by the first worker thread, the response message by, for each response of the plurality of responses:
      identifying a corresponding task reference in the particular companion buffer that corresponds to said each response based on order or order information with respect to the particular companion buffer and the response message; and
      using the corresponding task reference to identify and resume a task referenced by the corresponding task reference using the response.

12. The at least one non-transitory computer-readable media of claim 11,
   the instructions further comprising instructions that cause:
   processing a second plurality of tasks by a second worker thread executing at the local computing unit;
   for each task of the second plurality of tasks that requires access to respective data stored at the particular remote computing unit:
      adding, to a second request buffer, an access request for the respective data to which access is required by said each task,
      adding, to a second companion buffer, a task reference identifying said each task, and
      blocking said each task and proceeding, by the second worker thread, to a next task of the second plurality of tasks;
   sending a second request message comprising access requests in the second request buffer to the particular remote computing unit;
   receiving, from the particular remote computing unit, a second response message comprising a plurality of responses to the access requests in the second response message;
   processing, by the second worker thread, the second response message.

13. The at least one non-transitory computer-readable media of claim 11,
   the instructions further comprising instructions that cause:
      for each task of the first plurality of tasks that requires access to respective data stored at a second remote computing unit:
         adding, to a third request buffer, an access request for the respective data to which access is required by said each task,
         adding, to a third companion buffer, a task reference identifying said each task, and
         blocking said each task and proceeding, by the first worker thread, to a next task of the first plurality of tasks;
      sending a third request message comprising access requests in the third request buffer to the second remote computing unit;
      receiving, from the second remote computing unit, a third response message comprising a plurality of responses to the access requests in the third response message;
      processing, by the first worker thread, the third response message.

14. The at least one non-transitory computer-readable media of claim 11, the instructions further comprising instructions that cause: after sending the request message, access requests stored in the request buffer are released in memory.

15. The at least one non-transitory computer-readable media of claim 14,
   wherein the request buffer is a pre-allocated buffer obtained from a buffer pool;
   wherein releasing the access requests stored in the request buffer includes returning the request buffer to the buffer pool after sending the request message to the particular remote computing unit.

16. The at least one non-transitory computer-readable media of claim 11, the instructions further comprising instructions that cause:
   maintaining a plurality of request buffers and a plurality of companion buffers at the local computing unit;
   wherein each request buffer of the plurality of request buffers comprises access requests for data stored at a particular remote computing unit that is required for tasks processed by a specific worker thread.

17. The at least one non-transitory computer-readable media of claim 11, wherein the first plurality of tasks processed by the first worker thread that require access to respective data stored at the particular remote computing unit includes a task that requires access to data located in a volatile memory of the particular remote computing unit.

18. The at least one non-transitory computer-readable media of claim 11,
   wherein the first plurality of tasks processed by the first worker thread that require access to respective data stored at the particular remote computing unit includes a task that invokes a remote procedure call at the particular remote computing unit;
   the instructions further comprising instructions that cause:
      adding, to the request buffer, information comprising a remote procedure call;
      wherein, when processing the request message to generate the response message, the particular remote computing unit processes the information by performing the remote procedure call.

19. The at least one non-transitory computer-readable media of claim 11,
  wherein at least one of the request message and the response message comprises metadata that includes a companion buffer reference identifying the particular companion buffer; and
  wherein identifying the particular companion buffer is based on the companion buffer reference.

20. The at least one non-transitory computer-readable media of claim 11, the instructions further comprising instructions that cause: the decision to flush the request buffer to be responsive to determining that the request buffer is full or in response to a flush command.

* * * * *

UNITED STATES PATENT AND TRADEMARK OFFICE
CERTIFICATE OF CORRECTION

PATENT NO. : 9,535,756 B2
APPLICATION NO. : 14/619414
DATED : January 3, 2017
INVENTOR(S) : Depner et al.

Page 1 of 1

It is certified that error appears in the above-identified patent and that said Letters Patent is hereby corrected as shown below:

In the Claims

In Column 18, Line 22, in Claim 13, after "to" delete "the".

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*